(12) United States Patent
Novikov et al.

(10) Patent No.: US 7,140,244 B2
(45) Date of Patent: Nov. 28, 2006

(54) APPARATUS AND METHOD FOR MEASURING INFLATION PRESSURE

(75) Inventors: Mark Novikov, Acre (IL); Benjamin Geller, Acre (IL)

(73) Assignee: Valentina Melnikov, Haifa (IL)

( * ) Notice: Subject to any disclaimer, the term of this patent is extended or adjusted under 35 U.S.C. 154(b) by 212 days.

(21) Appl. No.: 10/481,384

(22) PCT Filed: Sep. 23, 2003

(86) PCT No.: PCT/IL03/00432

§ 371 (c)(1),
(2), (4) Date: Dec. 19, 2003

(87) PCT Pub. No.: WO2004/002757

PCT Pub. Date: Jan. 8, 2004

(65) Prior Publication Data

US 2005/0061071 A1    Mar. 24, 2005

(51) Int. Cl.
*B60C 23/03*    (2006.01)
(52) U.S. Cl. .................. 73/146.5; 73/146; 73/146.3
(58) Field of Classification Search ....... 73/146–146.8; 340/444–447
See application file for complete search history.

(56) References Cited

U.S. PATENT DOCUMENTS

| | | |
|---|---|---|
| 4,308,520 A | 12/1981 | Darlington |
| 4,330,774 A | 5/1982 | Doty |
| 4,615,211 A | 10/1986 | Kolm et al. |
| 5,163,320 A | 11/1992 | Goshima et al. |
| 5,335,541 A | 8/1994 | Sharpe |
| 5,394,343 A | 2/1995 | Tsao |

*Primary Examiner*—Edward Lefkowitz
*Assistant Examiner*—Jermaine Jenkins
(74) *Attorney, Agent, or Firm*—Blank Rome LLP

(57) ABSTRACT

An apparatus for measuring inflation pressure of a resilient-walled vessel, e.g. of a vehicle tire associated with an inflation valve and with a rim. The apparatus has an external, portable member and a pressure sensing member, which is separate from the portable member and is located within the tire so as to be exposed to the inflation pressure. The portable member is capable of generating and transmitting energy to the pressure sensing member and in response to receive and to process a pressure signal, which depends on the inflation pressure and upon processing of the pressure signal to derive therefrom an inflation pressure value. The pressure sensing member is capable, upon receiving energy from the portable member, to generate the pressure signal and to transmit it to the portable member. The portable member has a probe that creates an electrical contact between the portable member and the pressure sensing member upon establishing physical contact between the probe and the valve. The pressure sensing member creates n electrical contact with the rim and with the valve.

19 Claims, 9 Drawing Sheets

APPARATUS AND METHOD FOR MEASURING INFLATION PRESSURE

This application is a national phase of PCT/IL2003/000432 (WO2004/002757) filed May 25, 2003, which claims the benefit of Provisional Application No. 60/391,237, filed Jun. 26, 2002.

FIELD OF THE INVENTION

The present invention relates to measuring of internal pressure within a resilient-walled vessel. More particularly the invention refers to apparatus comprising portable handheld probe member suitable for measuring of internal pressure of a pneumatically inflated tire of a vehicle and to a measuring method, implemented in this apparatus.

BACKGROUND OF THE INVENTION

There are known various methods and devices, which have been devised for measuring of internal pressure within a pneumatically inflated tire of a vehicle. Those means can be divided into various groups according to the principle of their operation:

The first group includes monitoring systems mounted on a vehicle wheel and capable to detect and indicate the pressure within a tire when the vehicle moves and the wheel spins. Those systems usually comprise non-contact sensors attached to the wheel and capable to activate an alarm to alert a driver that the pressure in one of his tires is abnormally low. An example of such a system is a tire pressure sensing system disclosed in U.S. Pat. No. 4,330,774.

The second group refers to so-called pressure gauges operating without air connection with the tire and suitable for measuring of internal pressure of a non-moving wheel.

In U.S. Pat. No. 4,615,211 is disclosed a pressure gauge for tires and other elastic vessels which measures the pressure by sensing deformation of a wall of the vessel without establishing fluid communication with the interior of the vessel. The deformation within the wall of the vessel is induced by engagement of the wall by a deformable element. The engagement may be achieved by moving either the gauge or the vessel: the gauge could be swung to strike a tire or the tire could be driven onto the gauge. The pressure gauge comprises a deformable element, a rigid guard element surrounding the deformable element and means for sensing the deformation of the deformable element.

Still further group refers to gauges mounted on a wheel so as to be in fluid communication with the interior of a tire. Those devices operate when the wheel is not moving. An example of such a system is an electronic tire gauge disclosed in U.S. Pat. No. 5,394,343. This system comprises valve stem, fitting means for receiving the valve stem of a tire and pressure transducer means coupled to the stem fitting means and capable to generate a pressure signal representing the pressure sensed. The measured pressure is transmitted outside as a radio signal, received by an external receiver, which transfers the radio signal into electric signal, corresponding to the measured pressure and displays its value. The disadvantage of this system is associated with the necessity to provide transducer means with a dedicated source of energy, which renders the whole gauge complicate, expensive and less reliable. Furthermore, such system creates noise, since the transducer means broadcasts the radio signal permanently.

Another example of pressure measuring device, based on the above principle of transmitting pressure signal to an external receiver is described in U.S. Pat. No. 5,335,541. In this patent is disclosed pressure measuring device, which consists of discrete pressure sensing member, located on a tire and of a handheld portable member, which is brought into proximity with the pressure sensing member, when it is required to measure the pressure. The portable handheld member is provided with an electrical power source, power signal generator means and power signal transmission means, which is adapted to transmit the power signal to the discrete pressure sensing member in order to energize it. The handheld member is provided also with appropriate pressure signal receiver means for receiving pressure signal output from the pressure sensing member and with pressure signal processor means and display means for displaying an inflation pressure value generated by the signal processor means. The pressure sensing member is provided with pressure cell means, power signal receiver means, with power signal conditioning means, signal generator means and transmission means.

In this pressure-measuring device power is transmitted between the handheld apparatus and the pressure sensing apparatus by electromagnetic induction and therefore a power-transmitting coil is provided in the handheld member, which should be put over corresponding power-receiving coil, mounted in the pressure sensing member. The handheld member is configured as a cup attachable to a cylindrical portion of the pressure sensing member, which projects from the wheel hub. Since the power-receiving coil of the pressure sensing member resides in the cylindrical portion, it should always be brought in alignment with the cup to enable sliding fit with the power-transmitting coil of the handheld member.

Accordingly an operator should always make sure that the handheld member is properly put on the pressure sensing member. This requirement renders the whole apparatus inconvenient in exploitation, especially when it is used in conditions of bad weather, limited visibility or in darkness.

Besides such pressure sensing member cannot be attached to any standard valve of a vehicle tire without introducing changes in the standard wheel design.

Furthermore, exploitation of the apparatus requires adjusting the existing hub to make possible mounting thereon of the pressure sensing member.

The above-described pressure sensing member has relatively complicated construction, which includes pressure cell, tuning capacitor, pressure cell and three separate printed circuit boards. This renders the whole device relative expensive and less reliable.

It should be born in mind, however that this apparatus has been devised primarily for measuring pressure in large tires, namely aircraft undercarriage wheel tires, where the above disadvantages presumably are less appreciable. However, in the applications, which require measuring inflation pressure in a tire of a relatively small or a medium-sized vehicle, e.g. private car, autobus, truck, tractor etc., this apparatus in fact would be inferior and even disadvantageous in comparison with traditional, commonly used pneumatic pressure gauge.

Thus, despite existence of various devices, which have been devised for measuring inflation pressure, there still exists a need in a new and improved device, which combines advantages of the known pressure-measuring devices, but is free of their drawbacks.

OBJECTS OF THE INVENTION

The main object of the invention is to provide for a new device for measuring internal pressure of an inflated tire, which principle of operation is based on transmitting energy from an autonomous, portable probe member to a pressure sensing member mounted within the tire and receiving from this member a signal, which depends on the value of the internal pressure.

The other object of the present invention is to provide for a new and improved device, which has simple, modular construction, which has small size, is inexpensive and does not require adaptation of existing tire for mounting thereon of the pressure sensing member.

Still further object of the invention is to provide a device, which can be immediately actuated by arbitrary touching the valve by the portable member and without necessity to bring the portable member in alignment with the pressure sensing member.

The other object of the invention is to provide for a device, which is convenient in exploitation irrespective of the tire size.

Another object of the invention is to provide for a new and improved device, which operation is associated with reduced noise broadcasting.

The above and other objects and advantages of the present invention can be achieved in accordance with the following combination of its essential features, referring to the different main embodiments thereof.

The first main embodiment of the present invention refers to an apparatus for measuring internal pressure within a resilient-walled vessel, e.g. within a vehicle tire, which is associated with an inflation valve and with a rim; said apparatus comprising an external, portable member and a pressure sensing member, which is separate from the portable member and is located within the tire so as to be exposed to the inflation pressure; said portable member is capable to generate and transmit energy to the pressure sensing member and in response to receive and to process a pressure signal, which depends on the inflation pressure and upon processing of the pressure signal to derive an inflation pressure value; said pressure sensing member is capable upon receiving energy from the portable member to generate the said pressure signal and to transmit it to the portable member; the portable member comprises a probe suitable for creating electrical contact between the handheld member and the pressure sensing member upon establishing physical contact between the probe and the valve; and said pressure sensing member is capable to create electrical contact with the rim and with the valve.

According to further embodiment the present invention refers to an autonomous pressure sensing member for use with an apparatus for measuring inflation pressure of a vehicle tire associated with an inflation valve and a rim; said autonomous pressure sensing member comprises: a RF converting unit provided with a two pole input terminal and capable upon receiving energy in the form of a RF oscillation to convert it into a DC voltage. The pressure sensing member comprises also a pressure signal generating unit provided with a two pole output terminal and capable upon receiving the said DC voltage to sense the inflation pressure, to generate and emanate a modulated RF signal which depends on the inflation pressure; wherein said pressure sensing member is attachable to the valve with possibility to create electrical contact between the valve and one pole of the input terminal and between the valve and one pole of the output terminal and also electrical contact between the rim and a second pole of the input terminal and the rim and a second pole of the output terminal.

The present invention concerns also a method for measuring inflation pressure of a resilient-walled vessel, e.g. of a vehicle tire associated with an inflation valve and with a rim; the method of the invention is based on supplying energy from an external, portable member to a pressure sensing member to cause the pressure sensing member to produce a pressure signal, which depends on the inflation pressure and receiving the pressure signal by the portable member and processing thereof in order to derive therefrom the inflation pressure value; wherein the said method comprises establishing a closed electrical circuit between the portable member and the sensing member, a portion of said circuit being a natural capacity between the rim and a body of an operator, holding the portable member.

For a better understanding of the present invention as well of its benefits and advantages, reference will now be made to the following description of its various embodiments taken in combination with the accompanying drawings.

DETAILED DESCRIPTION OF SPECIFIC EMBODIMENTS

The working principle of the present invention is based on transmitting of energy from an external autonomous member to a pressure sensing member, which is located within inflated resilient vessel. The pressure sensing member is exposed to the inflation pressure and is capable upon energizing to sense the inflation pressure within the vessel and to generate a signal, depending on this pressure. This signal is then transmitted by the pressure sensing member to the external member and is processed in the external member to derive the value of the inflation pressure.

Accordingly, the first embodiment of the present invention concerns an apparatus which comprises two main components, i.e. an external member and a pressure-sensing member. These members are respectively presented in FIGS. 1–3 and in FIG. 7.

Figure 1:
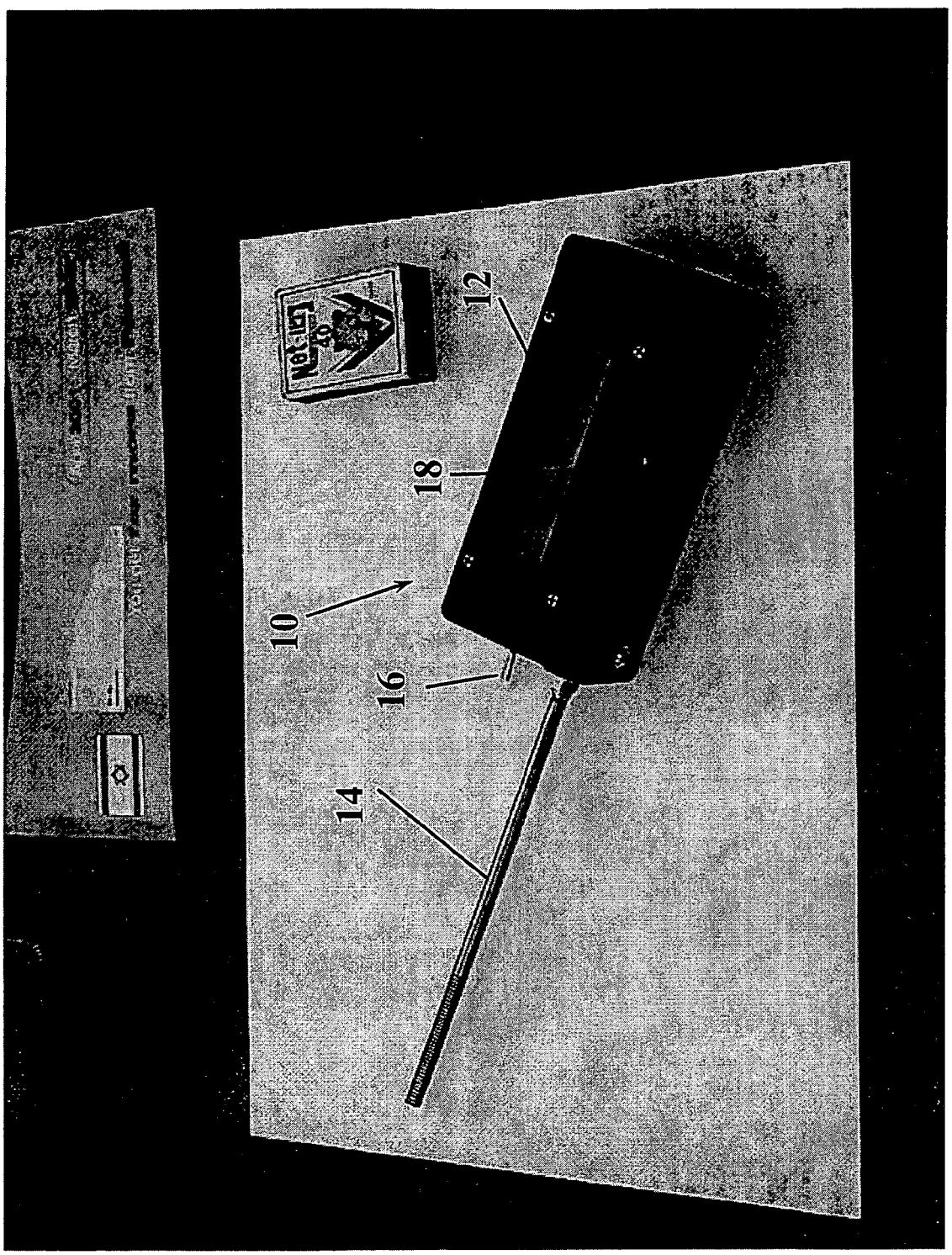
FIG. 1 is a general view of the handheld portable member of the invention.

Referring now to FIG. 1 the external member 10 is seen, which is configured as a box having housing 12, in which are received various electrical and electronic components, which are necessary for producing and transmitting energy to the pressure sensing member and for receiving and processing of pressure signal, generated and transmitted by the pressure sensing member.

The external member is dimensioned as a relative small box, having elongated housing, which is conveniently graspable and can be held by operator's hand. In FIG. 1 a matchbox is depicted near to the external member to emphasize its relatively small size. It can be readily appreciated that by virtue of small size the external member is light and easily portable. In the further description this member will be referred to as a portable member. It is also seen that the portable member comprises also a probe 14, which is configured as a thin, elongated post, protruding outside from the housing. It will be apparent and described in more details later on that the probe functions as an antenna, which is capable to transmit energy from the portable member to the pressure-sensing member.

It is also seen that on the short side of the housing a switch 16 is provided. The switch is easy accessible and its function is to activate or deactivate the portable member. It is also seen that a window 18 is provided on the upper wall of the housing to make visible a LC or a LED display, intended to visualize the value of the measured pressure after it has been derived from the pressure signal.

Figure 2:
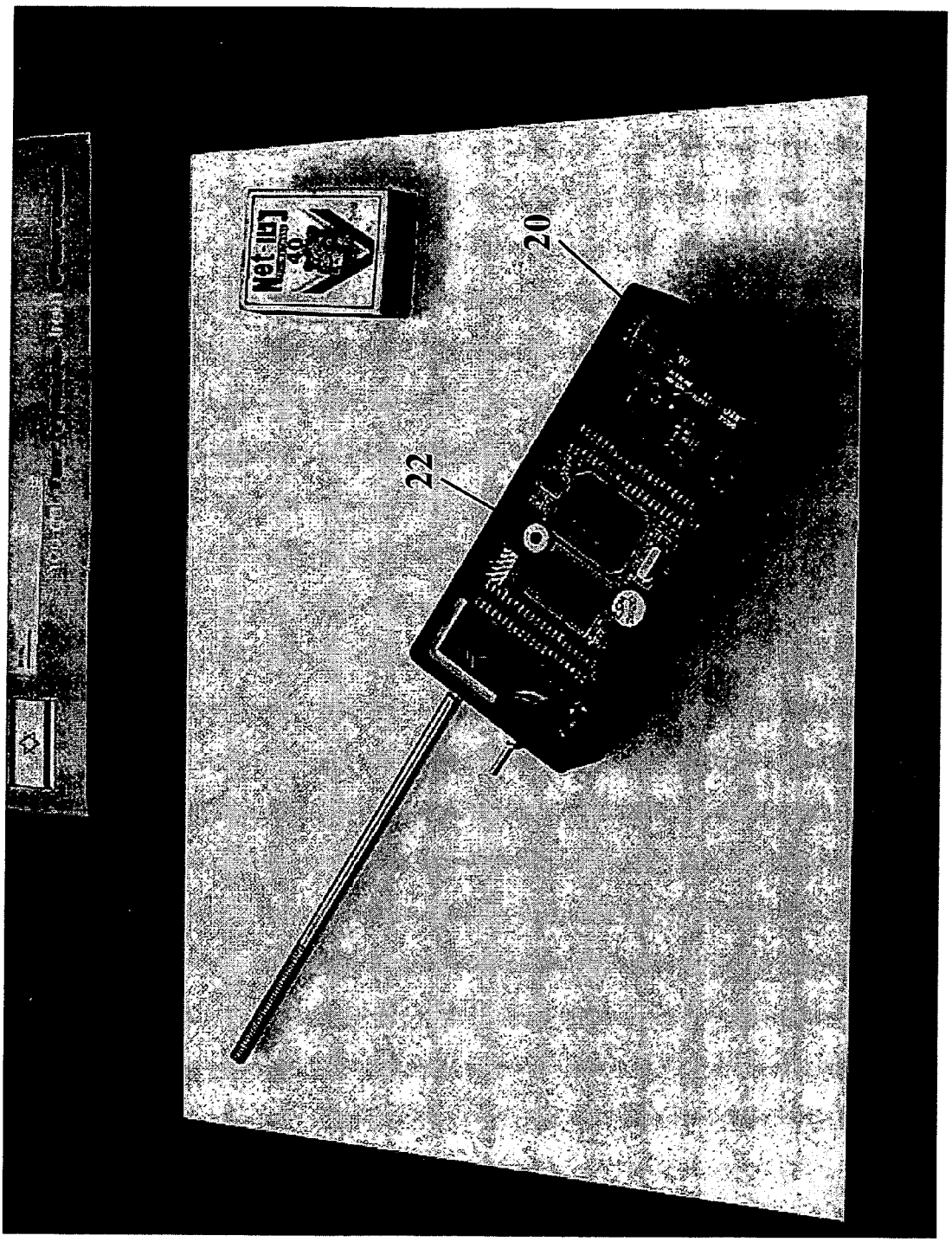
FIG. 2 presents the handheld portable member without its upper cover to show the portable member's interior.

With reference to FIG. 2 the portable member is presented with removed upper wall to show its interior. It can be seen, that among various components residing within the housing is included, inter alia, a battery 20 and a printed circuit board 22 with suitable electronic chips, required for processing the pressure signal and deriving the pressure value. The content of the interior of the portable member includes also some other components and among them a power supply unit with a battery 20, a readout unit, a two-pole input terminal and a two-pole output terminal. These and other components of the portable member will be described further with reference to FIG. 6.

Figure 3:
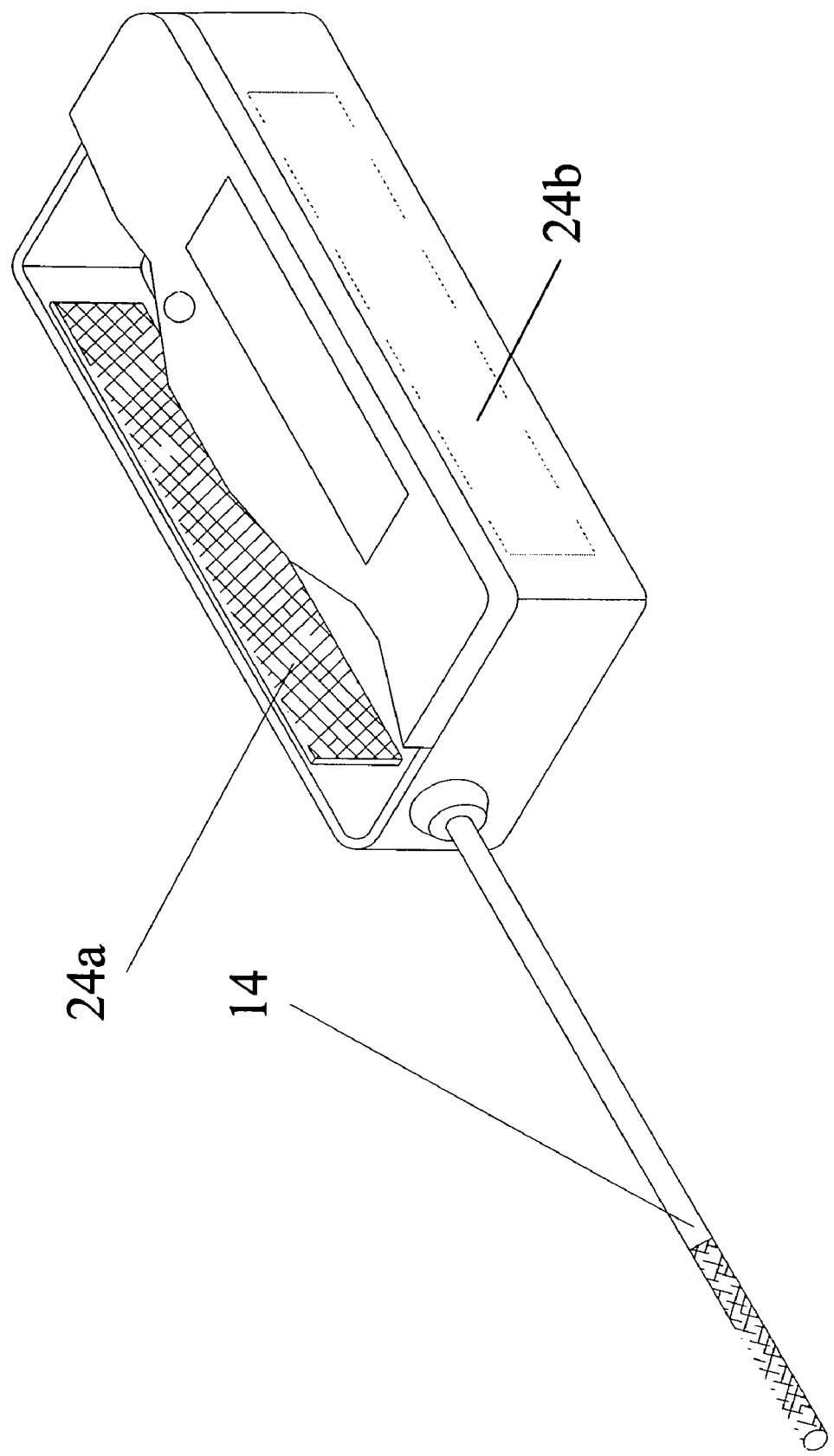
FIG. 3 shows the handheld portable member and electrically conducting regions.

In FIG. 3 is schematically shown, that regions 24,a, 24b are provided on opposite walls of the housing. These regions are made of electrically conductive material and they are electrically connected with the input and output terminal of the portable member. It should be appreciated, however, that in practice it might be sufficient if only single electrically conductive region is provided.

It is also seen, that the conductive regions extend along the walls of the housing so as to be always near the operator's hand when it holds the portable member. By virtue of this provision it is possible to establish an electrical circuit between the operator's body and the power supply unit and between the operator's body and the readout unit. The significance of this electrical circuit will become apparent further.

Figure 4:
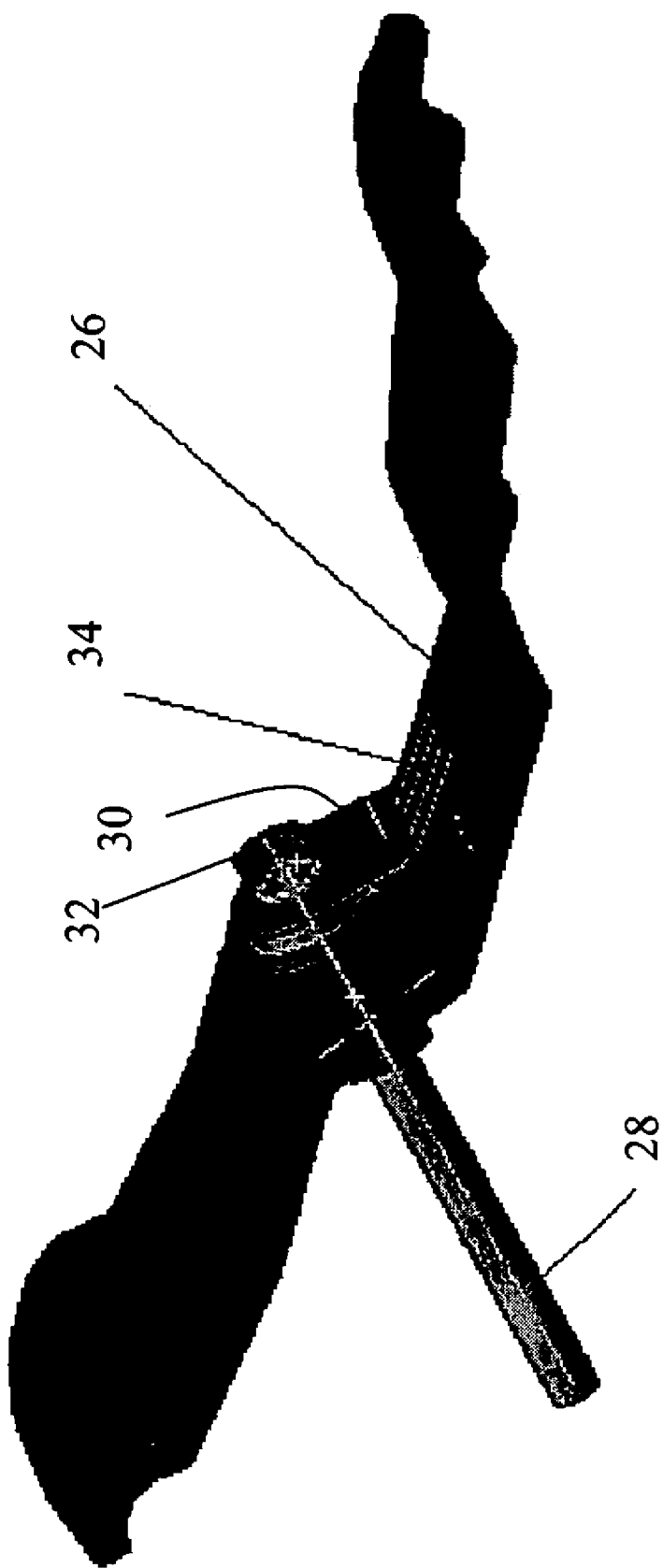
FIG. 4 is a partial isometric view of the rim, valve and pressure sensing member when it is secured on the valve.

Now with reference to FIGS. 4,5 it will be explained how the autonomous pressure-sensing member is deployed and secured within an inflated vessel. As a suitable vessel, which internal pressure can be advantageously measured with the aim of the present invention one can mention a vehicle tire or any other receptacle having resilient walls. The vehicle tire is usually associated with a rim and with a valve, through which a pressurized medium is delivered to inflate the tire. FIG. 4 is a partial view of depicting a rim 26 and a valve 28, having its stem protruding through the rim into the tire (the tire is not shown). It is not seen in the FIG. 4 but should be appreciated that the opposite end of the stem protrudes from the tire outside and finishes with a nipple. Secured on the inner end of the valve so as to be exposed to the inflation pressure a pressure sensing member 30 is provided. The pressure sensing member is securable on the valve stem by virtue of a locking screw 32, which can be screwed within the valve stem. By virtue of this provision a very simple, convenient and fast mounting of the pressure-sensing member on the existing valve is possible. It is seen also in FIG. 4, that the pressure-sensing member is provided with a flat contact portion 34, which is configured as at least one resilient lamella, touching the rim after the pressure sensing member is secured on the valve.

Figure 5:
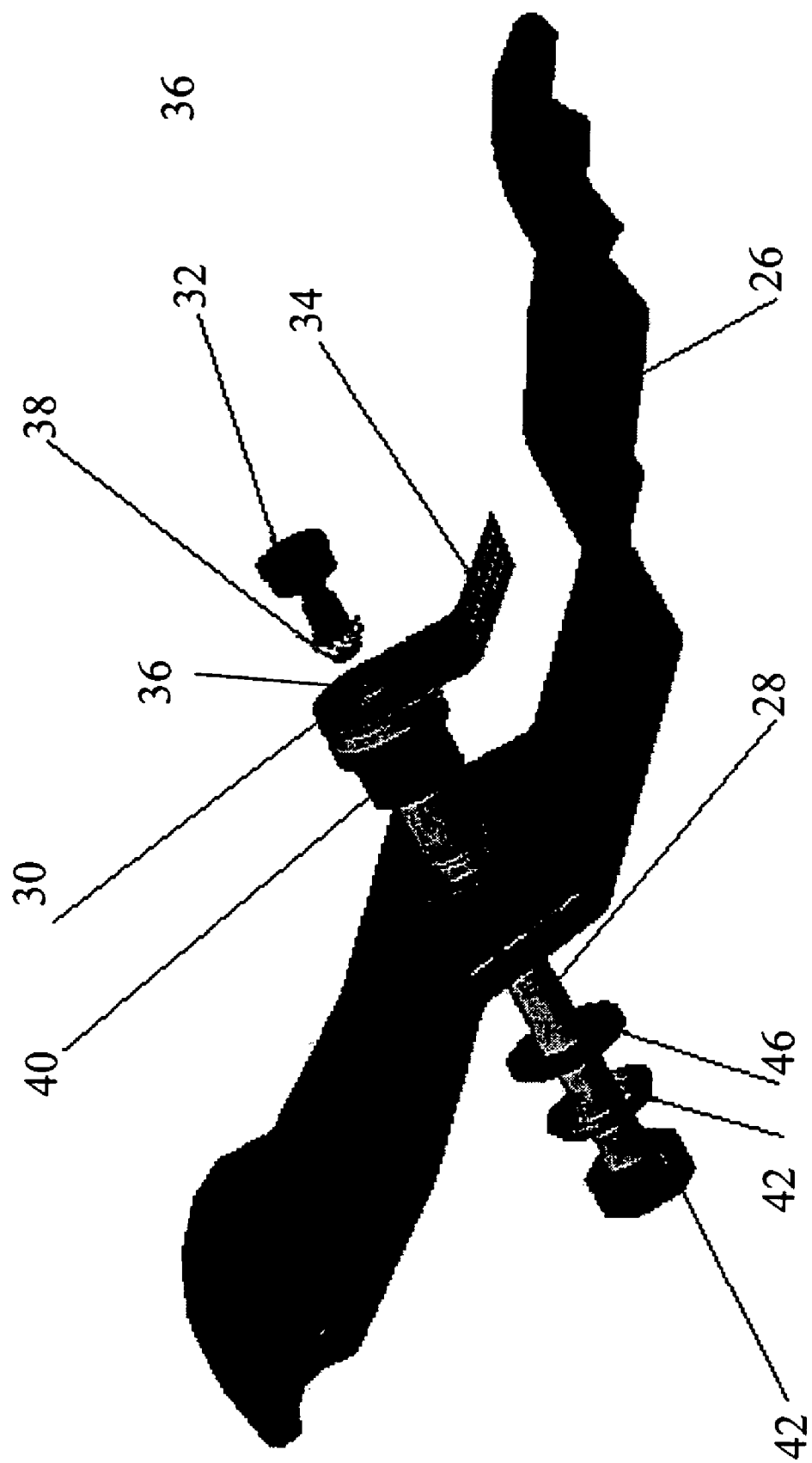
FIG. 5 is a partial exploded isometric view of the rim, valve and pressure sensing member.

FIG. 5 is a partial exploded view of the FIG. 4 showing in details how the pressure sensing member is secured. It is seen, for example, that configuration of the pressure sensing member matches the shape of the inner end of the stem. A through-going opening 36 is provided in the pressure-sensing member and a washer 38 is provided on the locking screw. By virtue of this provision the pressure sensing member can be reliable secured on the valve stem. Put on the valve stem beneath the inner end thereof a grommet 40 is provided, which is made of an electrically insulating and at the same time resilient material, for example rubber. The grommet is located between the rim and the valve and serves as a seal capable to electrically insulate the rim from the valve. It is not shown specifically, but should be appreciated that the stem is provided with a suitable screw for a locking nut 42, which presses against the rim when screwed. A metallic washer 44 and a sealing ring 46 are provided between the nut and the rim to ensure that the pressure sensing member is properly fixed on the valve when the nut is screwed and that there would be no electrical contact between the rim and the valve. It should be born in mind, however that electrical contact is provided between the pressure sensing member and the valve and at the same time between the pressure sensing member and the rim. The first contact is possible since the pressure-sensing member is in immediate physical contact with the valve end and with the metallic locking screw. The second contact is possible by virtue of lamellae, provided on the contacting portion of the pressure sensing member.

Figure 6:
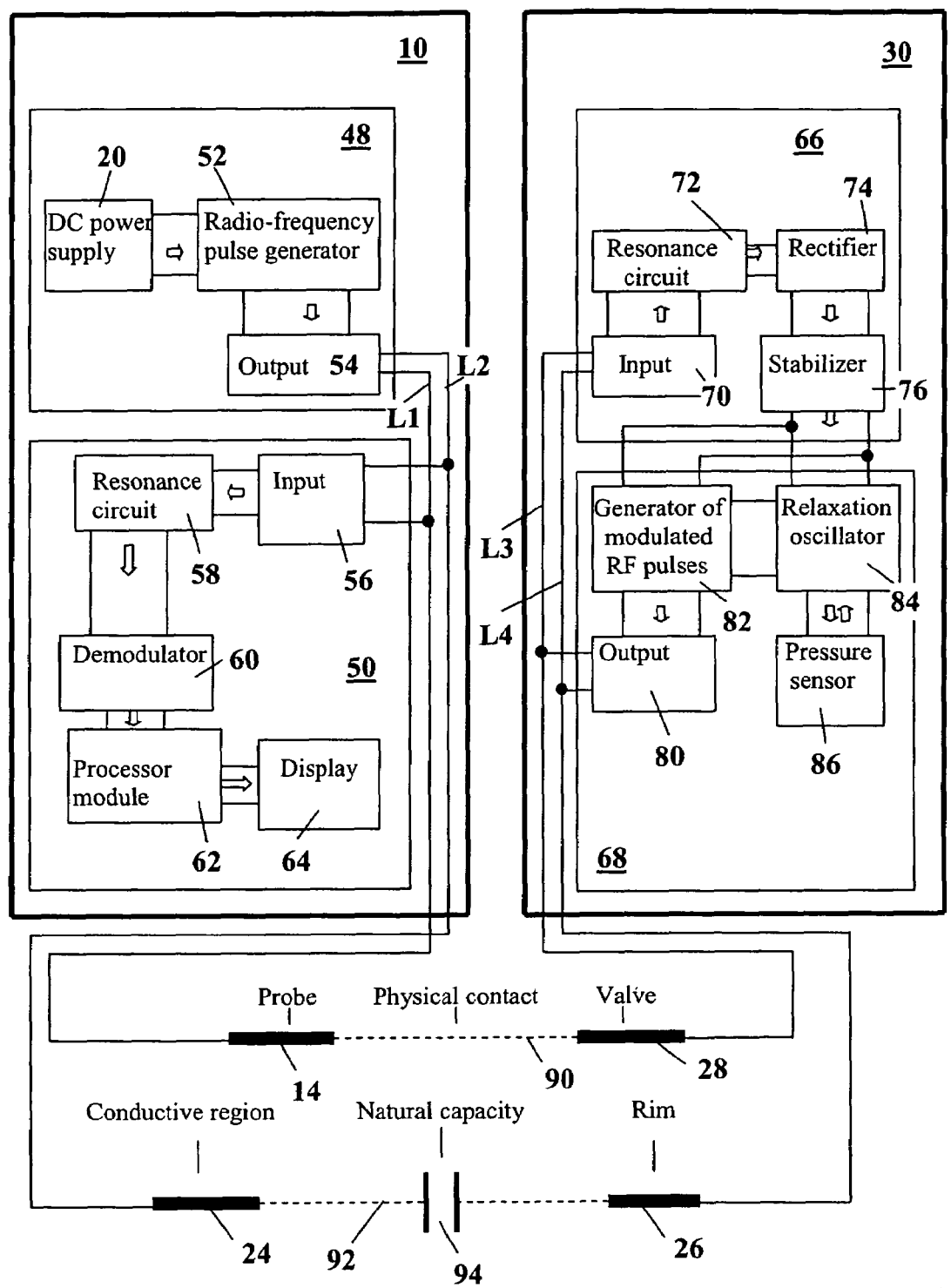
FIG. 6 is a circuit diagram of the apparatus of the invention.
Figure 7:
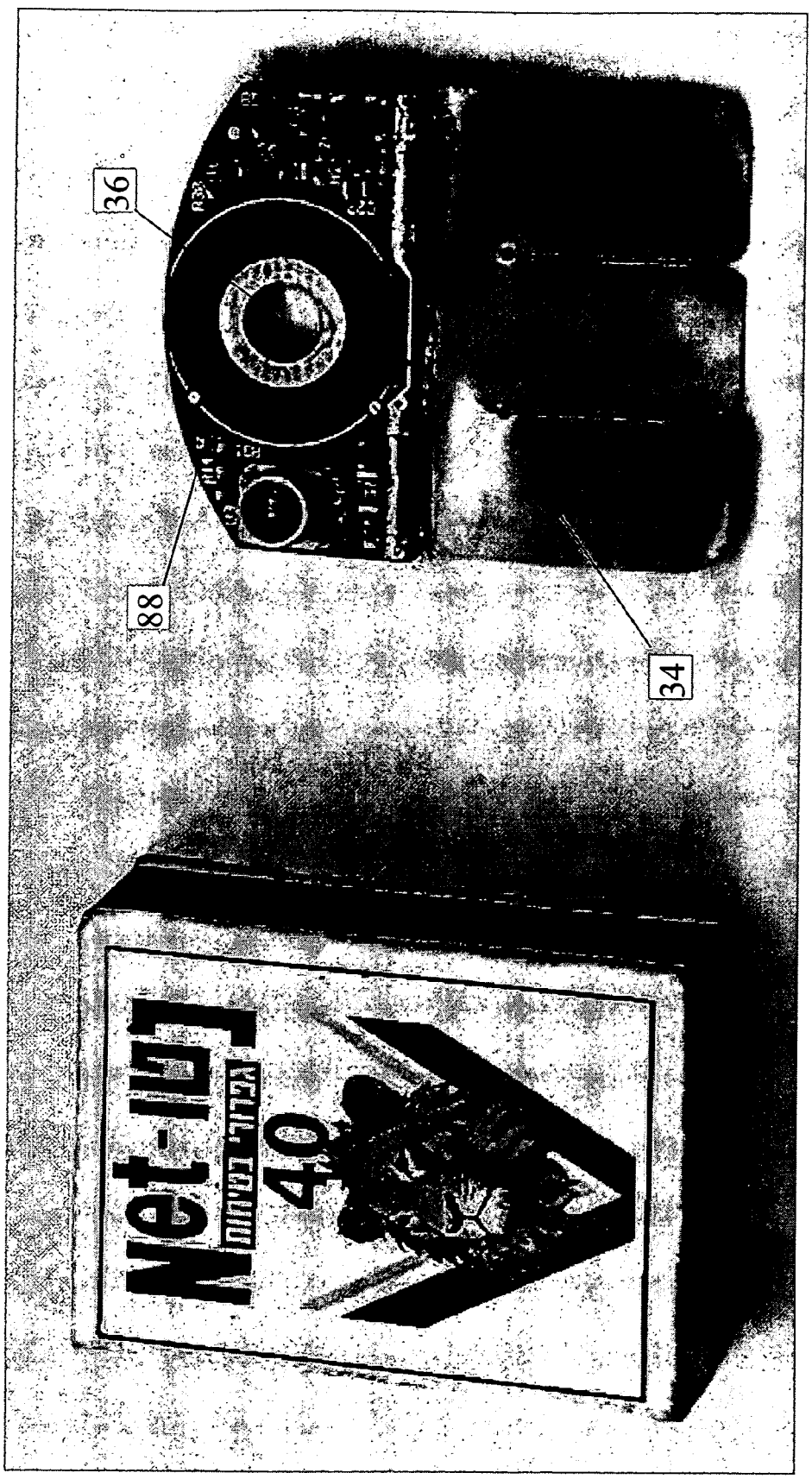
FIG. 7 is a photograph of the pressure sensing member.

Referring now to FIGS. 6 and 7, a circuit diagram of the apparatus of the present invention will be explained and so the construction of the pressure sensing member.

As best seen in FIG. 6, the electronic part of the portable member 10 comprises two main components, which have been already briefly mentioned, i.e. the power supply unit and the readout unit. The power supply unit is designated by reference numeral 48 and the readout unit is designated by reference numeral 50. The main function of the power supply unit is to generate energy, which can be further transmitted to the pressure sensing member. In accordance with the invention the energy is generated and transmitted outside in the form of a RF oscillation.

For this purpose a ordinary radio-frequency pulse generator 52 is employed, which is connected to the battery 20 or to other conventional DC power supply source, capable to supply low DC voltage of about 9 volts. This generator is capable to produce a rectangular RF pulse with carrier frequency in the range of 1÷20 MHz.

It is seen in the diagram, that the radio-frequency pulse generator outputs the RF oscillation to the two-pole output terminal 54. A line L1 leading to the probe 14 electrically connects one pole of the output terminal 54 with the generator and a line L2 connects the second pole of the output terminal with at least one conductive region, provided in the portable member. By virtue of this provision the generated RF oscillation can be transmitted through the probe to any object, after the probe is brought in physical contact with this object, providing that the physical contact is sufficient for establishing an electrical contact between the probe and the object. In accordance with the present invention this measure is employed here for transmitting energy from the portable member to the pressure sensing member. As explained above the pressure sensing member is secured on the valve in such a manner that electrical contact is established therebetween. It can be readily appreciated, that once the probe is brought in physical contact with the valve, the RF oscillation can be transferred to the pressure sensing member via the probe and the valve stem.

The readout unit 50 is intended for receiving the pressure signal, which is transmitted by the pressure sensing member in the form of a modulated RF signal depending on the inflating pressure. The readout unit is capable to receive this modulated RF signal, to demodulate it, to derive therefrom the inflation pressure value and to display it. The readout unit is provided with connected in turn a two-pole input terminal 56, a first resonance circuit 58, a demodulator means 60, a processor module 62 and a LC or LED display 64. As a suitable resonance circuit one can use the circuit with capacity and inductance, and as a suitable demodulator means one can use a rectifier circuit.

The processor module is a programmable processor chip, capable to process the demodulated signal so as to derive therefrom a modulation frequency value and further to convert it into pressure value by comparing and approximation with the values stored in a calibration function file, loaded in the chip memory beforehand.

It is also seen, that one pole of the input terminal 56 is connected to the line L1 and the second pole thereof is connected to the line L2. By virtue of this provision the input terminal 56 similarly to the output terminal 54 is connected to the probe and to the at least one conductive region of the portable member.

The pressure-sensing member 30 comprises a RF converting unit 66 and a pressure signal-generating unit 68. The RF converting unit is intended for receiving the RF oscillation transmitted thereto (through the circuitry loop, which includes the probe, valve stem and the natural capacity between the rim and the operator's body) and then for converting it into a DC voltage. The aim of the pressure signal-generating unit is to sense the inflation pressure upon receiving the DC voltage and to generate the pressure signal, which depends on the inflation pressure. The pressure-signal-generating unit is intended to generate the pressure signal optionally as an on-off modulated RF signal and to transmit it outside through the rim 26.

The RF converting unit is provided with connected in series a two-pole input terminal 70, a second resonance circuit 72, a rectifier 74 and a stabilizer 76. In practice one can use a suitable commercially available diode-capacitor rectifier and a suitable Zener diode stabilizer.

As the second resonance circuit 72 one can use similar component as for the first resonance circuit 58.

It is seen in the diagram, that one pole of the input terminal 70 is electrically connected to the valve 28 and the second pole of the input terminal is electrically connected with the rim 26.

The pressure signal-generating unit comprises a two-pole output terminal 80 and connected in turn a generator of on-off modulated RF pulses 82, a modulating relaxation oscillator 84 and a pressure sensing circuit 86. The generator of modulated RF pulses is electrically connected to the output terminal 80 and to the modulating relaxation oscillator, while the pressure sensing circuit is electrically connected to the relaxation oscillator. It is also seen that the stabilizer of the RF converting unit 66 is electrically connected in parallel to the generator of modulated pulses 82 and to the relaxation oscillator 84.

It is advantageous if the relaxation oscillator is capable to produce rectangular pulses with frequency, which may be in the range 500–2000 HZ. In practice one skilled in the art can easily build suitable generator of modulated RF pulses and suitable relaxation oscillator from commercially available components.

A common line L3 electrically connects one pole of the input terminal 70 and one pole of the output terminal 80 with the valve, while a common line L4 electrically connects the second pole of the input terminal 70 and the second pole of the output terminal 80 with the rim 26.

Being a part of the pressure-sensing member the pressure sensing circuit 80 is exposed to the inflation pressure. This circuit is configured as a previously fitted tensometric bridge circuit for air pressure measurement, which is capable upon supplying thereto a DC voltage to output a DC voltage signal once it is deformed and unbalanced by the inflation pressure. As a suitable tensometric bridge circuit one can use, for example, product MS52XX-A (range 7 Bar) manufactured by Intersema Co.

The outputted DC voltage signal depends on the inflation pressure and the relaxation oscillator 84 converts it into a sequence of pulses. This sequence of pulses proceeds to modulation by the generator of on-off modulated RF pulses 82. The modulated signal is outputted through the output terminal 80 to the valve and to the rim.

It is schematically shown in FIG. 6 by a dotted line 90, that between the probe 14 and the valve 28 exists direct electrical contact, which establishes immediate after the probe touches the valve. At the same time between the conductive portion of the portable member and the rim establishes an indirect electrical contact designated by a dotted line 92. This contact takes place via a natural capacity of a space between the rim and operator's body (not shown. It has been revealed, that by virtue of the direct and indirect contact a closed electrical circuit can be established between the portable member and the pressure sensing member. This closed circuit can be advantageously employed as a communication channel for transmitting energy from the portable member for energizing the pressure-sensing member and for transmitting pressure signal from the pressure sensing member to the portable member.

As best seen in FIG. 7 the pressure-sensing member is a very compact component, which size is comparable with the size of a matchbox. The pressure-sensing member has flat shape and it comprises a printed circuit board (PCB) portion 88 and a contact portion 34. The PCB portion carries the above-mentioned electronic components referring to the RF converting unit and the pressure signal-generating unit. In the central part of the PCB portion the opening 36 is seen for the locking screw. The contact portion 34 is made of an electrically conductive material, preferably metallic material and it can be configured for example as three resilient lamellae, which ensure reliable electrical contact with the rim.

Thus construction of the pressure-sensing member is very simple, its retrofitting within the tire does not require space and is not associated with any significant modification of the existing valve. The pressure-sensing member can be deployed either on the already existing tire or during manufacturing of the tire.

Figure 8:
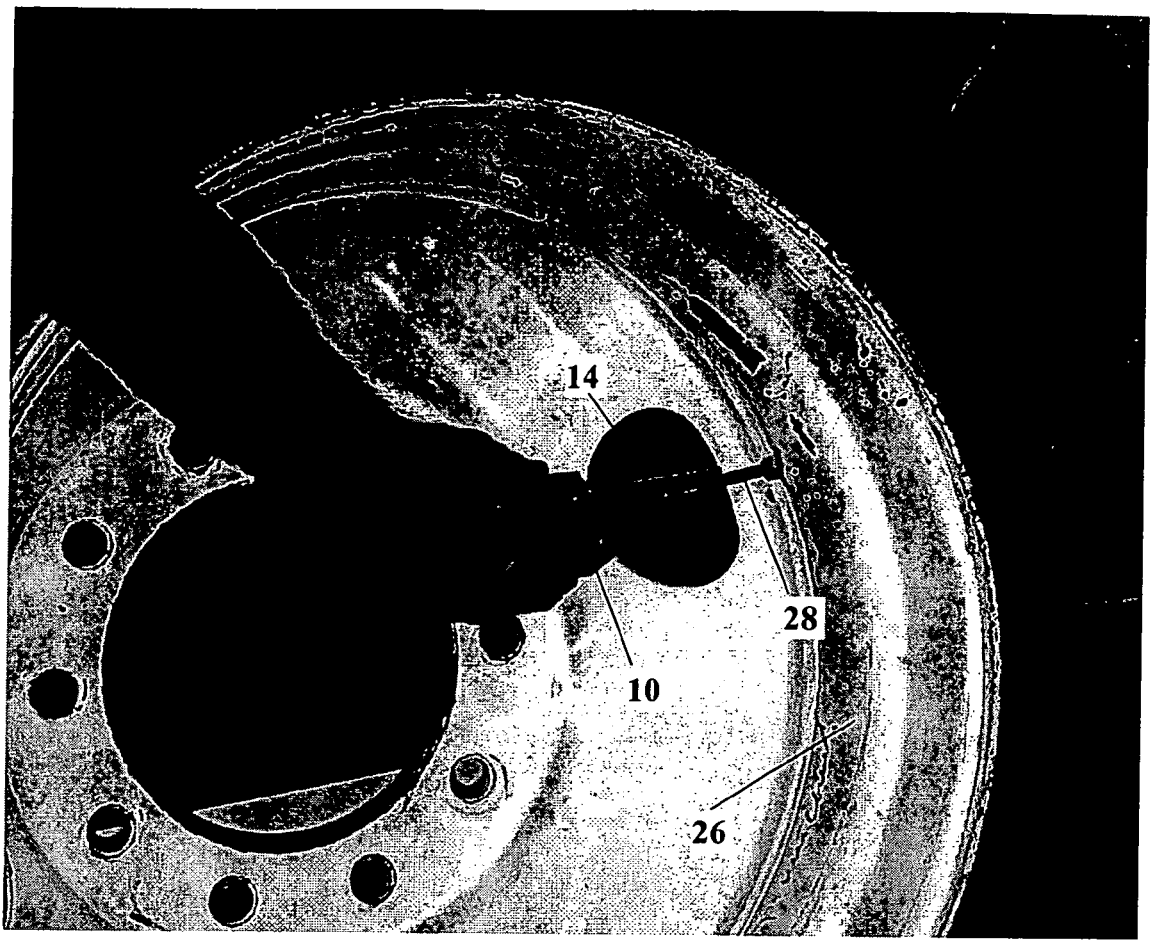
FIG. 8 shows how inflation pressure is measured with the aim of the portable member.

In FIG. 8 is shown operator's hand holding the portable member 10 and bringing it in physical contact with the valve 28, which stem protrudes outside from the rim 26. It is not seen in FIG. 8, but should be understood, that the pressure sensing member is secured on the opposite end of the valve.

In order to establish physical contact it would be sufficient just to touch the valve in an arbitrary point. There is no need to align the probe with the valve or to put the portable member on the valve and mechanically attach it thereto.

Figure 9:
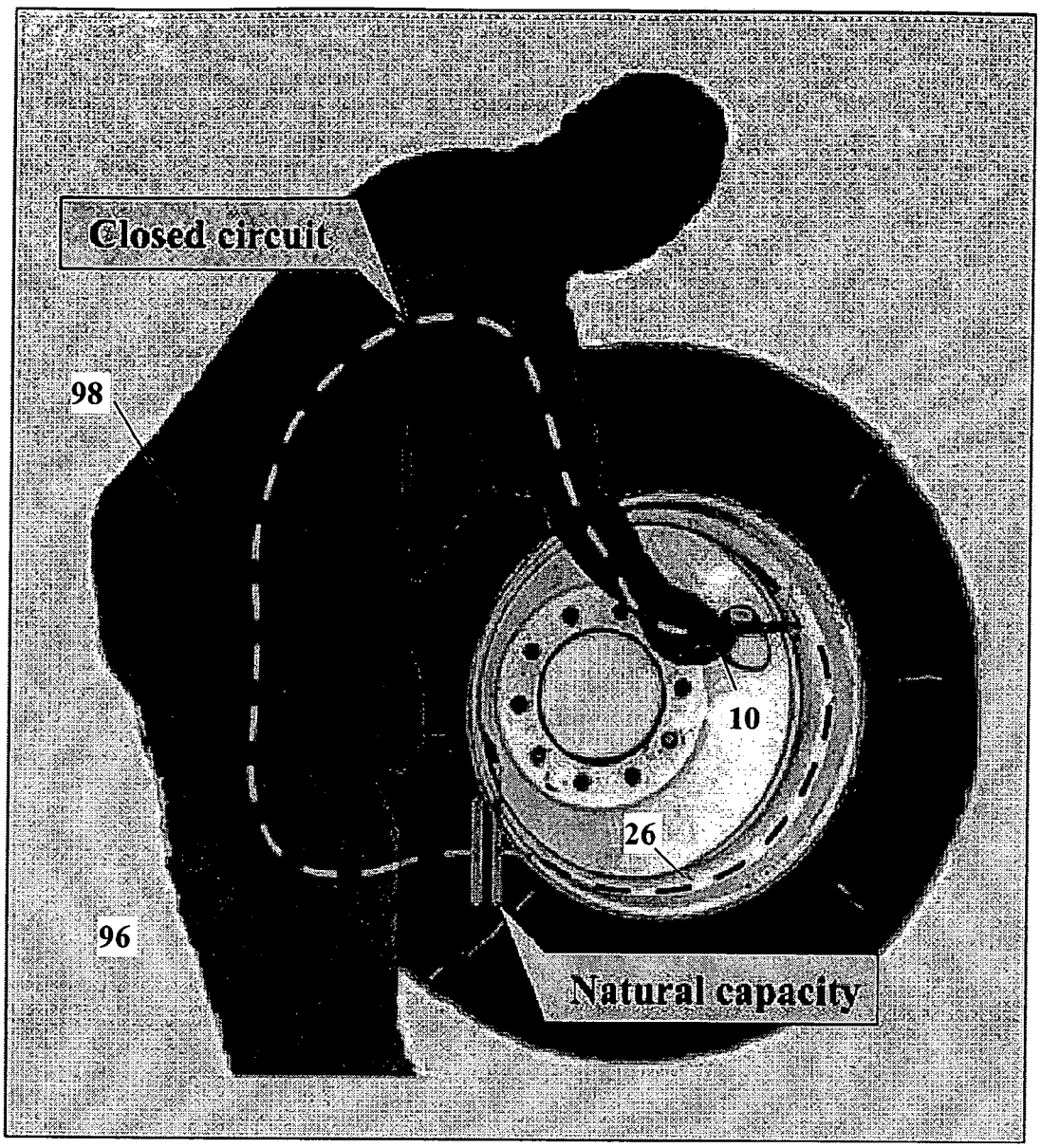
FIG. 9 presents schematically the closed circuit, which is established between the portable member, the tire and operator's body.

FIG. 9 illustrates by dotted line the portion 96 of the closed circuit. This portion exists between the portable member 10, valve 28, rim 26, operator's body 98 and operator's hand 100. It is depicted in FIG. 9, that indirect contact between the rim and the operator's body is possible by virtue of the natural capacity 94 of the space included between the rim and operator's body.

Now functioning of the apparatus in accordance with the present invention will be explained.

To measure the pressure within the tire the operator holds the portable member in such a manner, that his palm overlaps with at least one conducting region. The operator brings the probe in physical contact with the valve and activates the portable member by switch 16. The DC voltage is supplied from battery 20 to the RF pulse generator 52, which in response generates RF pulse. This pulse proceeds through the output terminal 54 of the portable member and then through the closed circuit to the input terminal 70 of the RF converting unit 66.

Within the closed circuit the pulses proceed through one branch thereof, which consists of probe 14 and valve 28 and through another branch, which consists of conducting regions 24a,24b, operator's palm, operator's body 98, natural capacity 94 and rim 26. The RF pulse supplied to the RF converting unit proceed to the second resonance circuit 72 and then to the rectifier 74, which rectifies them. It is not shown in details, but should be appreciated, that the rectifier comprises suitable capacity elements, which accumulate energy in the form of a DC voltage. The rectified DC voltage proceeds to the stabilizer 76, which stabilizes it during period of time in which the capacity elements partially discharge. During this time the DC voltage feeds the tensometric bridge circuit, which in response produces a voltage signal proportional to a disbalance caused by the inflation pressure. At the same time the relaxation oscillator 84, which is connected to the bridge circuit 80, varies its oscillation frequency in accordance with the voltage signal, produced by the bridge circuit, and hence in accordance with the inflation pressure. The varied oscillation constitutes a sequence of repetitive substantially rectangular pulses, which proceed to the generator of modulated RF pulses 82. This sequence of pulses constitutes a modulating signal defined by a modulating frequency. The generator produces a RF carrier signal, which frequency is optionally the same as of the RF oscillation, generated by the RF pulse generator 52 of the portable member. The modulating signal coming from the oscillator implements optionally on-off modulation of the RF carrier signal. In response to modulation the generator 82 produces a on-off modulated signal in the form of a repetitive bursts. The frequency of the bursts envelope is the on-off modulating frequency of the bursts repetition and depends on the inflation pressure and accordingly the modulated signal represents the pressure signal.

The pressure signal is outputted from the generator to the output terminal 80 and from here its proceeds via the closed circuit to the input terminal 56 of the portable member 10.

Within the closed circuit the pressure signal proceeds through one branch, which consists of valve 28 and probe 14 and through another branch, which consists of rim 26, natural capacity 94, operator's body 98, operator's palm and conductive regions 24a, 24b.

The pressure signal is filtered in the first resonance circuit 58 of the portable member and proceeds to demodulator 60, which demodulates it in order to define the bursts envelope. The envelope is then converted into digital form by the processor module 62 and modulating frequency is derived therefrom by virtue of a dedicated program loaded in the memory of the processor module. The modulating frequency is used for calculating the value of the inflation pressure. The calculating procedure is carried out in the processor module with the aim of a calibration function, which is loaded in a flashed EROM of the processor module (not shown). The calibration function links between measured in advance modulating frequencies and corresponding to them known values of the inflation pressure. The calculated value of the inflation pressure is displayed on the LC or LED display 64 and can be seen through window 18.

The present invention has many advantages in comparison with the known in the art solutions, devised for measuring inflation pressure in a vehicle tire. Some of these advantages are listed below.

The invention is suitable for measuring inflation pressure in any tire, irrespective of it size and type.

Since the measuring procedure requires only arbitrary touching the valve by the probe the apparatus is very easy and convenient in use and the measuring can be carried out in any weather conditions, in conditions of bad visibility or even in darkness.

The portable member is very convenient in use, since it does not require from operator to lean towards the wheel.

The pressure-sensing member has very simple, modular construction, its securing on the valve is simple and does not require to change the tire and existing valve.

Since the energy and the pressure signal is transmitted as RF oscillation, the communication between the portable member and the pressure-sensing member can take place through natural capacity between the rim and the operator. This possibility renders the communication channel easy, convenient and reliable.

Since the apparatus operates in a discontinuous mode and enables very fast measuring its operation is associated with very limited noise broadcasting.

The RF oscillation transmitted by the portable member can be used also as a signal suitable for identification of the tire, in which is secured the pressure sensing member. By virtue of this provision there is no need in a dedicated receiver means, which usually is required for recognizing the identification signal and establishing a communication link.

It should be appreciated that the present invention is not limited to the above-described embodiments and that one ordinarily skilled in the art can make modifications and changes without deviation from the scope of the invention, as will be defined in the appended claims.

Below are only some limited examples of various alternative embodiments, which one ordinarily skilled in the art could contemplate.

Instead of providing the housing with dedicated electrically conductive regions it would be sufficient if a portion of the housing itself is made electrically conductive.

The pressure-sensing member should not be necessary securable on the valve.

The pressure-sensing member can be secured on the valve not by screw, but by any other suitable mechanical means.

Electrical contact between the pressure-sensing member and the rim can be establsihed not on account of resilient lamellae, but by wire, etc.

Instead of balanced tensometric bridge circuit one could use another pressure sensor.

It is not compulsory that RF pulses, generated by the generator 52 and repetitive pulses, generated by the relaxation oscillator 84 are of rectangular shape.

It is also not compulsory, that the frequency of RF oscillation, produced by the generator 52 is equal to the frequency of the RF carrier signal, produced by the generator 82.

When used in the present specification the terms "comprise", "include", "have" as well as their synonyms mean "including but not limited to".

It should also be appreciated that the features disclosed in the foregoing description, and/or in the following claims, and/or in the accompanying drawings may, both separately and in any combination thereof, be material for realizing the present invention in diverse forms thereof.

What is claimed is:

1. An apparatus for measuring inflation pressure of a resilient-walled vessel of a vehicle tire associated with an inflation valve and with a rim; said apparatus comprising an external, portable member and a pressure sensing member, which is separate from the portable member and is located within the tire so as to be exposed to the inflation pressure; said portable member is capable to generate and transmit energy to the pressure sensing member and in response to receive and to process a pressure signal, which depends on the inflation pressure and upon processing of the pressure signal to derive therefrom an inflation pressure value; said pressure sensing member is capable upon receiving energy from the portable member to generate the pressure signal and to transmit it to the portable member; the portable member comprises a probe capable to create electrical contact between the portable member and the pressure sensing member upon establishing of a physical contact between the probe and the valve; and said pressure sensing member is capable to create electrical contact with the rim and with the valve.

2. The apparatus as defined in claim 1, in which said portable member comprises:
   a handheld housing, at least a portion thereof being electrically conductive and residing in the housing:
      a power supply unit suitable to generate energy in the form of a RF oscillation and to transmit this energy outside, said power supply unit is provided with a two-pole output terminal,
      a readout unit suitable to receive the pressure signal from the pressure sensing member and to process this signal in order to derive therefrom the inflation pressure value, said readout unit is provided with a two-pole input terminal;
   wherein one pole of the output terminal of the power supply unit and one pole of the input terminal of the readout unit is electrically connected with the probe and a second pole of the output terminal of the power supply unit and a second pole of the input terminal of the readout unit is electrically connected with the electrically conductive portion of the housing;
said pressure sensing member is provided with:
   a RF converting unit suitable to receive the RF oscillation transmitted by the power supply unit and to convert it into a DC voltage, said RF converting unit is provided with a two-pole input terminal,
   a pressure signal generating unit suitable to sense the inflation pressure upon receiving the DC voltage from the RF converting unit, to generate the pressure signal preferably in the form of a modulated RF signal, which depends on the inflation pressure and to transmit the pressure signal outside, said signal generating unit is provided with a two-pole output terminal,
wherein one pole of the input terminal of the RF converting unit and one pole of the output terminal of the pressure signal generating unit is electrically connected to the valve and to the second pole of the input terminal of the RF converting unit and the second pole of the output terminal of the pressure signal generating unit is electrically connected to the rim.

3. The apparatus as defined in claim 2, in which said power supply unit comprises a DC source and a RF pulse generator, which is electrically connected with the output terminal of the power supply unit and with the DC source; said readout unit comprises electrically connected with the input terminal thereof a first resonance circuit, a demodulator, a processing module and a display means; said RF converting unit comprises a stabilizer, a second resonance circuit, which is electrically connected with the input terminal of the RF converting unit and a rectifier; said pressure signal generating unit comprises a generator of the modulated RF signal, a relaxation oscillator and a pressure sensing circuit, said generator of the modulated RF signal is electrically connected with the output terminal of the pressure signal generating unit and with the relaxation oscillator, said pressure sensing circuit is electrically connected with the relaxation oscillator and said stabilizer is electrically connected with the generator of the modulated RF signal and with the relaxation oscillator.

4. The apparatus as defined in claim 3, in which said pressure sensing circuit comprises a bridge circuit.

5. The apparatus as defined in claim 1, in which said probe protrudes from the housing.

6. The apparatus as defined in claim 1, in which said conductive portion is located so as to be in vicinity of the operator's palm, when it holds the housing.

7. The apparatus as defined in claim 1, in which said pressure sensing member comprises a printed circuit board (PCB) portion, and a contact portion, said PCB portion is designed to carry the RF converting unit and the pressure signal generating unit, said PCB portion is adapted to establish electrical contact with the valve and said contact portion is designed to establish electrical contact with the rim.

8. The apparatus as defined in claim 7, in which said pressure sensing member is securable on the valve.

9. The apparatus as defined in claim 8, in which said PCB portion is securable on the valve's end located within the tire.

10. The apparatus as defined in claim 9, in which said PCB portion is provided with an opening for a locking screw.

11. The apparatus as defined in claim 7, in which said contact portion comprises at least one resilient, electrically conductive lamella.

12. A method for measuring inflation pressure of a resilient-walled vessel of a vehicle tire, wherein said tire is associated with an inflation valve and with a rim; said method is based on
   i) supplying energy from an external, portable member to a pressure sensing member in order to energize the pressure sensing member and produce a pressure signal, which depends on the inflation pressure and
   b) receiving the pressure signal by the portable member and processing thereof in order to derive therefrom the inflation pressure value;
wherein the said method comprises establishing a closed electrical circuit between the portable member and the sensing member, a portion of said circuit being a natural capacity between the rim and a body of an operator, holding the portable member providing the portable member with a probe and with at least one region, which is electrically conductive; said probe is suitable for establishing physical contact with the valve and said conductive portion is suitable for establishing electrical contact with the operator's hand, holding the portable member, locating the sensing member within the tire in a manner suitable for exposing thereof to the inflation pressure and for establishing electrical contact between the sensing member and the valve.

13. The method as defined in claim 12, comprising supplying energy from the portable member to the pressure sensing member in the form of a RF oscillation, converting the RF oscillation into a DC voltage supplying the DC voltage to a pressure signal generating unit so as to produce a voltage signal, depending on the inflation pressure, converting said voltage signal into a modulating signal in the form of a sequence of pulses, said modulating signal is defined by a modulating frequency, establishing a RF carrier signal defined by a carrier frequency, modulating the RF carrier signal by the modulating signal and establishing the pressure signal in the form of a sequence of repetitive bursts, outputting the pressure signal through said closed electrical circuit.

14. The method as defined in claim 13, in which said processing of the pressure signal comprises:

demodulating of the pressure signal and establishing the said sequence of pulses, deriving from the sequence of pulses the modulating frequency and deriving the inflation pressure value from the modulating frequency.

15. The method as defined in claim 12, comprising displaying the inflation pressure value derived from the pressure signal.

16. The method as defined in claim 13, in which a tensometric bridge circuit is used for producing the voltage signal.

17. The method as defined in claim 13, in which said DC voltage is stabilized before supplying thereof to the pressure signal generating unit.

18. The method as defined in claim 13, in which a rectangular shape defines the pulses in said sequence.

19. The method as defined in claim 13, in which said RF oscillation and said RF carrier signal are defined by the same frequency.

* * * * *